(12) United States Patent
Oono et al.

(10) Patent No.: US 7,058,060 B2
(45) Date of Patent: Jun. 6, 2006

(54) ATM APPARATUS, IP APPARATUS AND BUS SYSTEM

(75) Inventors: Haruyasu Oono, Koriyama (JP); Kimitoshi Takeuchi, Koriyama (JP)

(73) Assignee: Hitachi Telecom Technologies, Ltd., Fukushima-ken (JP)

( * ) Notice: Subject to any disclaimer, the term of this patent is extended or adjusted under 35 U.S.C. 154(b) by 851 days.

(21) Appl. No.: 09/957,534

(22) Filed: Sep. 21, 2001

(65) Prior Publication Data

US 2003/0058867 A1    Mar. 27, 2003

(51) Int. Cl.
*H04L 12/28* (2006.01)
*H04L 12/50* (2006.01)

(52) U.S. Cl. .............. 370/395.1; 370/362; 370/395.52; 370/455

(58) Field of Classification Search ........... 370/395.42, 370/395.43, 362, 444, 447, 455, 462, 395.1, 370/395.52

See application file for complete search history.

(56) References Cited

U.S. PATENT DOCUMENTS

| 5,619,500 A | * | 4/1997 | Hiekali | 370/414 |
| 6,667,977 B1 | * | 12/2003 | Ono | 370/392 |
| 2001/0036202 A1 | * | 11/2001 | Watanabe et al. | 370/535 |

* cited by examiner

*Primary Examiner*—Afsar Qureshi
(74) *Attorney, Agent, or Firm*—Mattingly Stanger Malur & Brundidge, P.C.

(57) ABSTRACT

Arbitration for a bus mastership is performed in accordance with the priority degrees of data which are to be transferred on a bus, by a comparatively simple construction. In a case where interfaces 2, 3 simultaneously output to the bus 1 the priority degrees which correspond to non-ATM lines 6, 7 being the reception sources or transmission destinations of the data stored in ATM cells, and where the priority degrees outputted by the interface themselves are the highest, the interfaces transmit to the bus 1, bus mastership request signals which contain the addresses of the interfaces themselves. A bus control module 4 receives the bus mastership request signals on the bus 1, it determines that one of the interfaces to which the bus mastership is granted, and it outputs to the bus 1 a bus mastership grant signal which contains the address of the determined interface.

5 Claims, 9 Drawing Sheets

ATM APPARATUS, IP APPARATUS AND BUS SYSTEM

BACKGROUND OF THE INVENTION

The present invention relates to technology for arbitration for a bus mastership in a bus system wherein data are transmitted and received among a plurality of modules through a bus.

Known as an apparatus which utilizes a bus system wherein data are transmitted and received among a plurality of modules through a bus is, for example, an ATM multiplexer wherein data sent from a plurality of non-ATM (Asynchronous Transfer Mode) lines are turned into ATM cells so as to transmit the ATM cells onto an ATM line, while ATM cells sent from the ATM line are decellularized into data so as to transmit the data to the plurality of non-ATM lines.

In such an ATM multiplexer, a non-ATM line interface module which accommodates the non-ATM lines, and an ATM line interface module which accommodates the ATM line are interconnected by the bus. Using the bus, the ATM cell sent from the ATM line is received and is transmitted to the non-ATM line interface module by the ATM line interface module, or the data sent from the non-ATM line are received and turned into the ATM cell by the non-ATM line interface module so as to transmit the ATM cell to the ATM line interface module.

In the ATM multiplexer as stated above, arbitration for a bus mastership for granting the use of the bus to only one interface module in a case where the plurality of interface modules simultaneously made requests for the use of the bus in order to transmit the ATM cells has heretofore been implemented merely by allowing the respective interface modules to use the bus in a predetermined sequence.

Since such arbitration for the bus mastership performs the priority control of the bus mastership in interface module units, it cannot perform the priority control of the bus mastership in accordance with the priority degrees of the ATM cells themselves to be transmitted or received on the bus. Therefore, the bus use of the ATM cell to be primarily transmitted in preference is postponed to that of the ATM cell of lower priority degree. This results in the problem that the transmission of the primarily preferential ATM cell to the line delays.

The problem is not limited only to the ATM multiplexer. It similarly arises in, for example, an IP multiplexer wherein data sent from a plurality of non-IP (Internet Protocol) lines are turned into IP packets so as to transmit the IP packets to an IP line, while data are derived from IP packets sent from the IP line so as to transmit the data to the plurality of non-IP lines.

SUMMARY OF THE INVENTION

The present invention has been made in view of the above circumstances, and has for its object to implement arbitration for a bus mastership in accordance with the priority degrees of data to be transferred on a bus, by a comparatively simple construction.

In order to accomplish the object, the present invention disposes a data bus connected to a plurality of modules, and bus control means connected to the data bus.

Further, each of the plurality of modules includes first transmission means for transmitting to the data bus, the priority degree of data intended to be transmitted to the data bus and a transmission request containing the address of the pertinent module itself, and second transmission means for transmitting the data intended to be transmitted to the data bus, in a case where a transmission grant signal containing the address of the pertinent module itself has been received from the data bus.

Besides, the bus control means selects one of the addresses transmitted to the data bus by line interface units which have transmitted the data of highest priority degrees to the data bus, and it transmits to the data bus the transmission grant signal which contains the selected address.

According to the present invention, the bus mastership can be arbitrated for in accordance with the priority degrees of the data to be transferred on the data bus, by the comparatively simple construction which utilizes the data bus for the data transfer as it is and in which the priority degrees of the data and the addresses of the respective modules are merely exchanged between the bus control means and the plurality of modules.

DETAILED DESCRIPTION OF THE PREFERRED EMBODIMENTS

Now, an embodiment of the present invention will be described by taking an application to an ATM multiplexer as an example.

Figure 1:
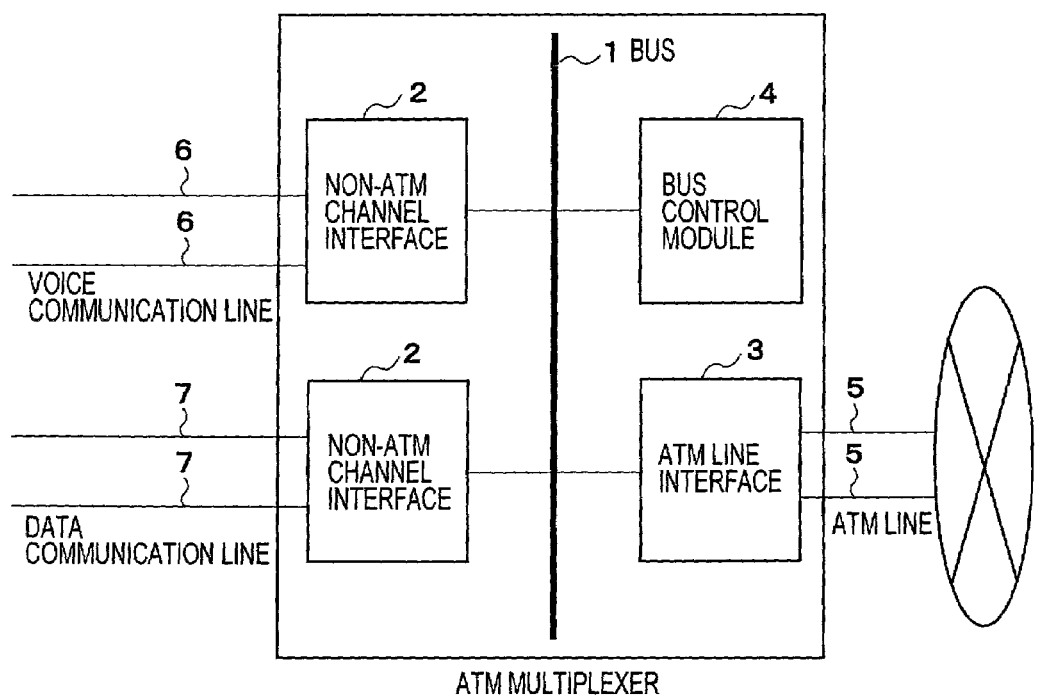
FIG. 1 is a block diagram of an ATM multiplexer to which an embodiment of the present invention is applied.

FIG. 1 shows the construction of the ATM multiplexer to which the embodiment is applied.

In the figure, numeral 1 designates a bus, numeral 2 a non-ATM line interface, numeral 3 an ATM line interface, numeral 4 a bus control module, numeral 5 an ATM line, numeral 6 a voice communication line being a non-ATM line, and numeral 7 a data communication line being a non-ATM line.

In the above construction, the non-ATM line interface 2 generates an internal cell by turning into an ATM cell, data which have been sent from the voice communication line 6 or data communication line 7 accommodated by this interface 2 itself, and by affixing to the ATM cell, a bus routing header which indicates the ATM line interface 3 being the destination of this ATM cell. Besides, the non-ATM line interface 2 transmits the internal cell to the bus 1. The ATM line interface 3 checks the bus routing header of the internal cell transmitted by the non-ATM line interface 2, and it receives the particular internal cell when the bus routing header indicates the address of a module accommodated by this interface 3 itself. Further, the ATM line interface 3 derives the ATM cell stored in the internal cell and transmits the derived ATM cell to the destination ATM line 5.

On the other hand, the ATM line interface 3 generates an internal cell by affixing a bus routing header to an ATM cell sent from the ATM line 5 accommodated by this interface 3 itself. Here, the bus routing header indicates the non-ATM line interface 2 to which the voice communication line 6 or data communication line 7 being the destination of the particular ATM cell is connected, on the basis of a corresponding VPI (Virtual Path Identifier)/VCI (Virtual Channel Identifier). Besides, the ATM line interface 3 transmits the generated internal cell to the bus 1. The non-ATM line interface 2 checks the bus routing header of the internal cell transmitted by the ATM line interface 3, it receives the particular internal cell when the bus routing header indicates the address of a module accommodated by this interface 2 itself, and it derives data from the ATM cell stored in the internal cell and transmits the derived data to the destination non-ATM line.

The bus control module 4 arbitrates for the mastership of the bus 1 for the ATM cell transmissions by the non-ATM line interfaces 2 and the ATM line interface 3 as explained above.

The details of the respective portions will be explained below.

Figure 2:
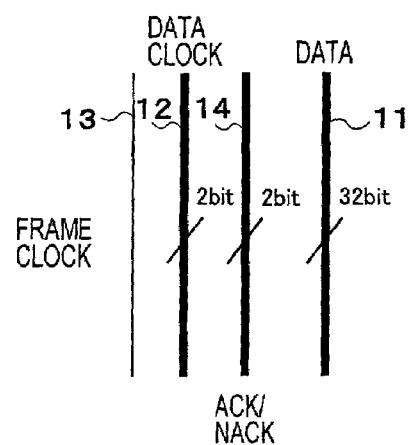
FIG. 2 is a diagram showing the configuration of a bus 1 shown in FIG. 1.

First, the configuration of the bus 1 is shown in FIG. 2.

As shown in the figure, the bus 1 is configured including a data bus 11 of 32-bit width, a data clock bus 12 which transmits a data clock for prescribing a data cycle, a frame clock bus 13 which transmits a frame clock for prescribing a frame cycle that is the period of 18 data cycles, and an ACK/NACK bus 14 of 2 bits which transmits an ACK/NACK signal for expressing the presence of the normal/abnormal reception of an ATM cell. Here, the "data cycle" is a cycle in which one data item of 32 bits is transmitted on the data bus 11. Incidentally, the reason why the data clock bus 12 is set at 2 bits is that two data clocks of different phases are transmitted as the data clock for the purpose of a stable operation.

Figure 3:
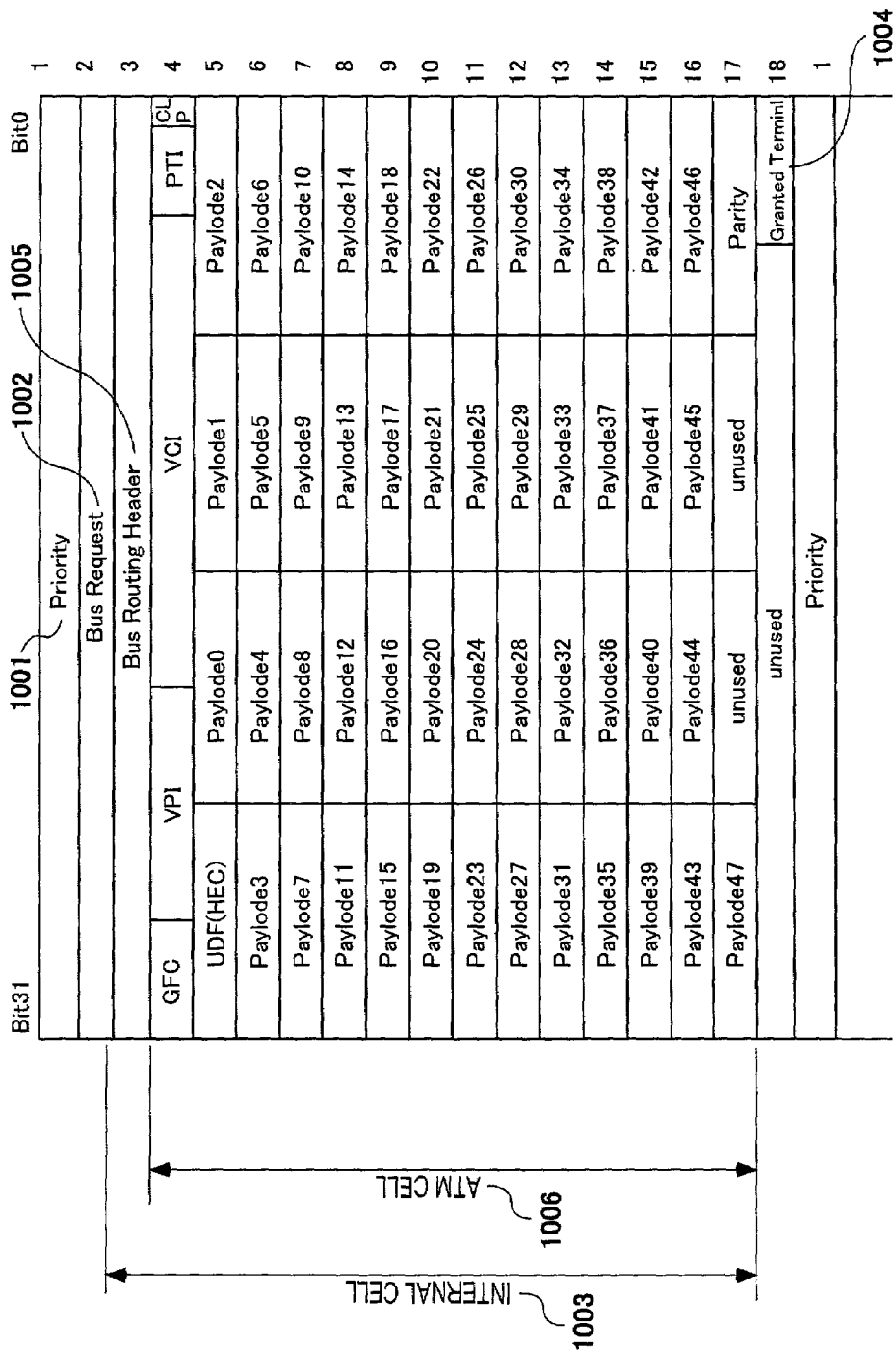
FIG. 3 is a diagram showing the transmission format of data which are transmitted on the bus 1 shown in FIG. 1.

Next, a transmission format on the data bus 11 is shown in FIG. 3.

As shown in the figure, the transmission format on the data bus 11 is such that a priority class signal (Priority) 1001 is transferred in the first data cycle of each frame cycle being the 18 data cycles, that a bus mastership request signal (Bus Request) 1002 is transferred in the second data cycle, that the internal cell 1003 explained before is transferred in the third to 17th data cycles, and that a bus mastership grant signal (Granted Terminal) 1004 is transferred in the 18th data cycle. Here, the bus routing header (Bus Routing Header) 1005 explained before is transmitted in the third one of the third to 17th data cycles being the transmission data cycles of the internal cell, and the ATM cell 1006 explained before is transmitted in the remaining fourth to 17th cycles.

Figure 4:
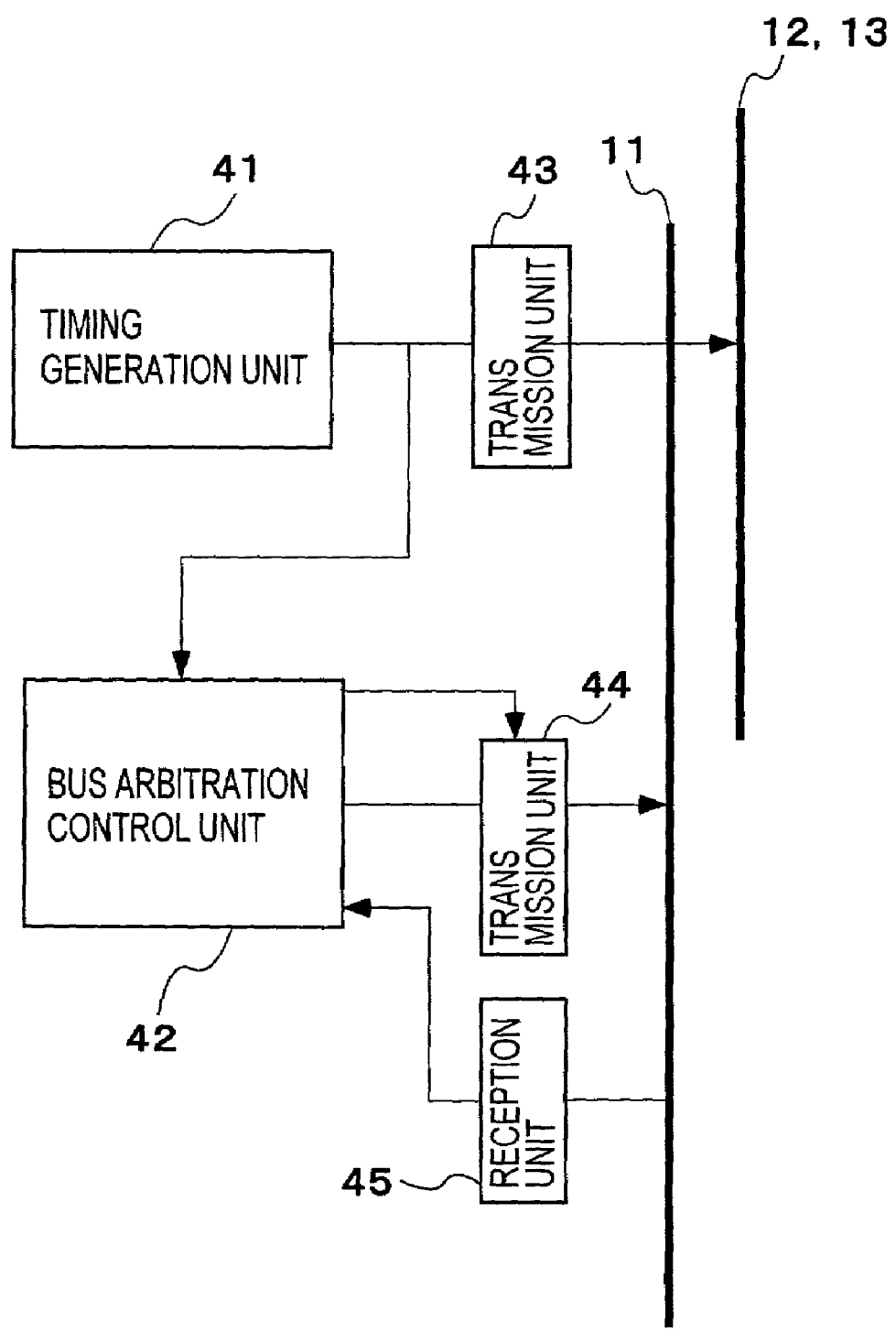
FIG. 4 is a block diagram of a bus control module shown in FIG. 1.

Next, the construction of the bus control module 4 is shown in FIG. 4.

As shown in the figure, the bus control module 4 includes a timing generation unit 41, a bus arbitration control unit 42, transmission units 43, 44, and a reception unit 45.

The timing generation unit 41 generates the data clock and frame clock as explained before, and transmits the respective clocks to the data clock bus 12 and frame clock bus 13 through the transmission unit 43.

On the basis of the data clock and frame clock generated by the timing generation unit 41, the bus arbitration control unit 42 receives the bus mastership request signals through the reception unit 45 in the second data cycle of each frame cycle, so as to arbitrate for a bus mastership in accordance with the bus mastership request signals. Besides, in the 18th data cycle, the bus arbitration control unit 42 controls into a transmission status the transmission unit 44 which is in a high impedance status in the other data cycles, and it transmits the bus mastership grant signal which contains the address of the non-ATM line interface 2 or ATM line interface 3 to have the bus mastership granted, to the data bus 11 through the transmission unit 44. The details of the arbitration for the bus mastership in the bus arbitration control unit 42 will be elucidated later.

Figure 5:
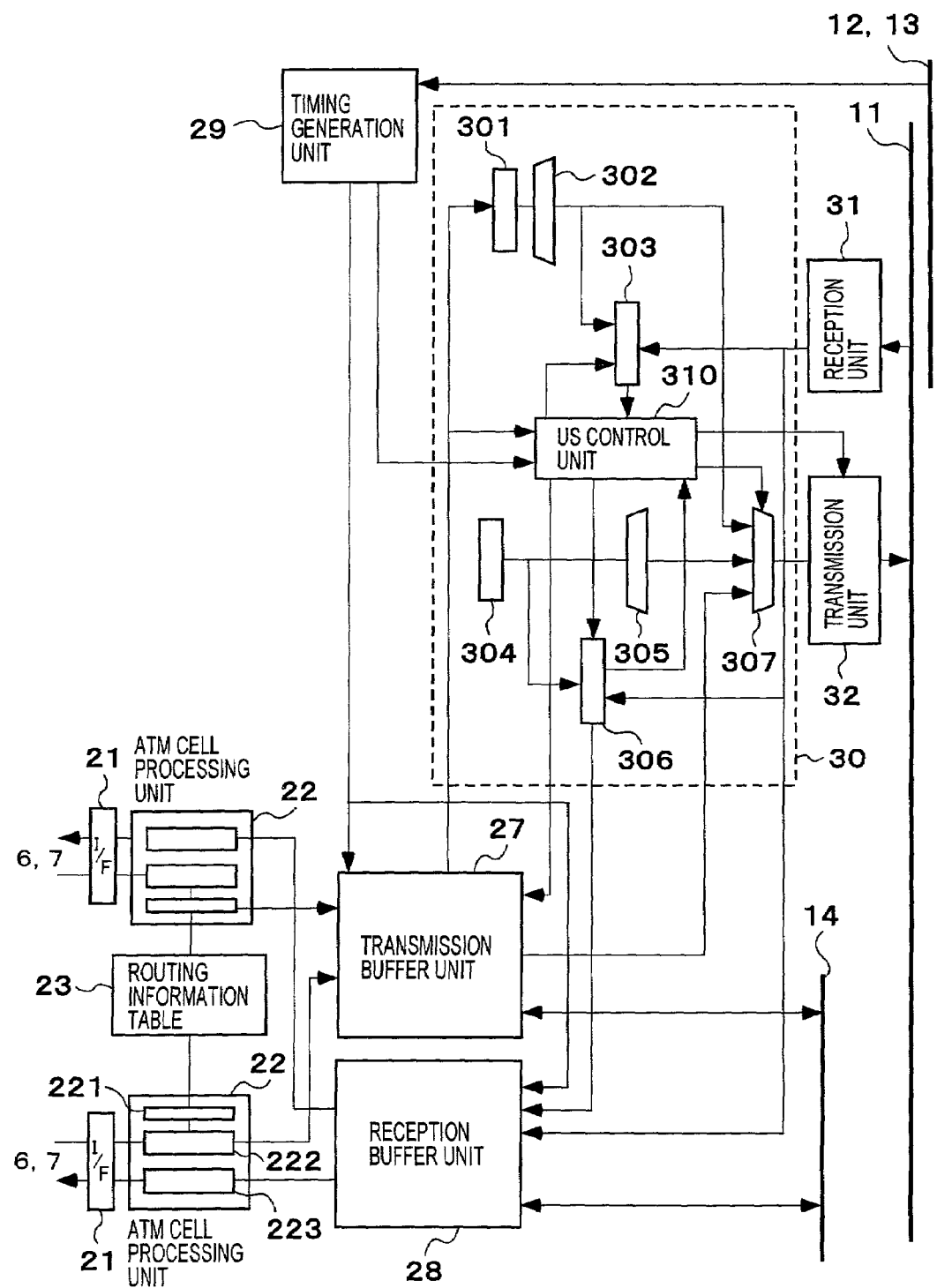
FIG. 5 is a block diagram of a non-ATM line interface shown in FIG. 1.

Next, the construction of the non-ATM line interface 2 is shown in FIG. 5.

As shown in the figure, the non-ATM line interface 2 includes a set consisting of an interface unit 21 and an ATM cell processing unit 22, in correspondence with each of the non-ATM lines 6, 7, such as voice communication lines and data communication lines, which are accommodated by this interface 2. In addition to the above, the non-ATM line interface 2 includes a routing information table 23, a transmission buffer unit 27, a reception buffer unit 28, a timing generation unit 29, a bus control unit 30, a reception unit 31 and a transmission unit 32.

Here, the timing generation unit 29 receives the data clock and frame clock from the data clock bus 12 and frame clock bus 13, respectively, and it generates timing signals expressive of the frame cycle and data cycles on the basis of the received clocks and feeds them to pertinent portions.

Further, the ATM cell processing unit 22 includes a routing-information affording portion 221, an ATM cell assembler 222 and an ATM cell disassembler 223.

Besides, the bus control unit 30 includes a priority class generator 301, a priority class decoder 302, a priority class coincidence detector 303, an address register 304, an address decoder 305, an address coincidence detector 306, a selector 307 and a controller 310.

Figure 6:
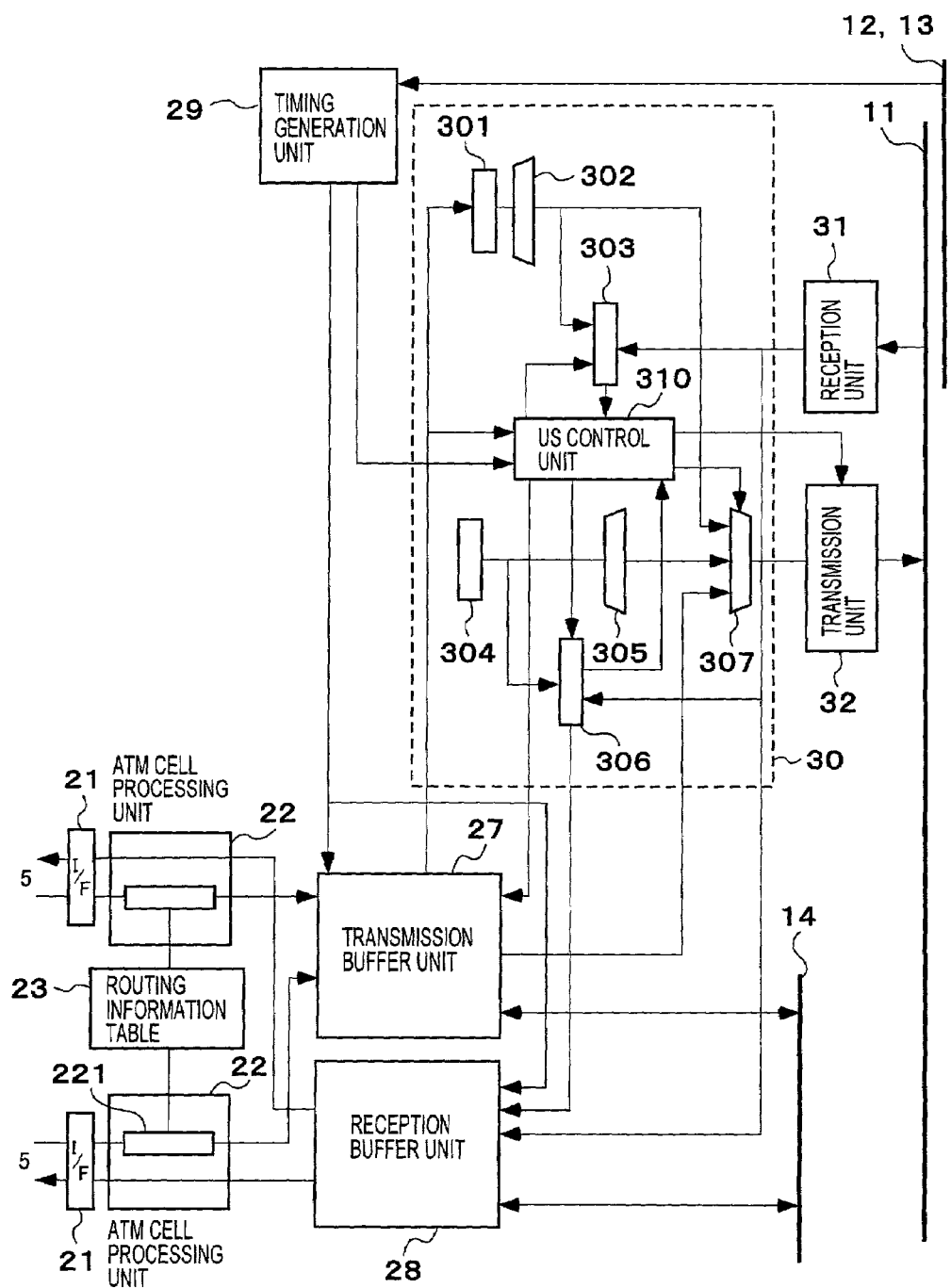
FIG. 6 is a block diagram of an ATM line interface shown in FIG. 1.

Next, the construction of the ATM line interface 3 is shown in FIG. 6.

As shown in the figure, the construction of the ATM line interface 3 is substantially similar to that of the non-ATM line interface 2. However, the former differs from the latter in the point that neither the ATM cell assembler 222 nor the ATM cell disassembler 223 is disposed in the ATM cell processing unit 22.

Here, unique addresses are respectively assigned to the non-ATM line interfaces 2 and the ATM line interface 3 beforehand. Each of the non-ATM line interfaces 2 and ATM line interface 3 stores the address assigned thereto, in the address register 304 of the bus control unit 30. Besides, channel numbers being unique in the non-ATM line interfaces 2 or the ATM line interface 3 are respectively preassigned to the non-ATM lines 6, 7 accommodated by the non-ATM line interfaces 2 or to the ATM lines 5 accommodated by the ATM line interface 3. Thus, the non-ATM lines 6, 7 or the ATM lines 5 are respectively specified uniquely by the combinations between the addresses and the line numbers.

There will now be elucidated the details of the operation of transferring ATM cells with the bus 1 in the ATM multiplexer of the above construction.

First, an operation in the case of transmitting an internal cell from each non-ATM line interface 2 to the bus 1 proceeds as explained below.

In the non-ATM line interface 2, the interface unit 21 receives data sent from the non-ATM line 6 or 7 accommodated by itself and inputs the data to the ATM cell processing unit 22.

Then, the routing-information generating portion 221 of the ATM cell processing unit 22 reads out a VPI/VCI, an address and a line number which correspond to the non-ATM line 6 or 7 having sent the data and which are previously set in the routing information table 23, and it affords them to the ATM cell assembler 222. Here, the address is that of the ATM line interface 3, and the channel number is that of the ATM line 5 for which the VPI/VCI corresponding to the non-ATM line is set.

Subsequently, the ATM cell assembler 222 assembles the ATM cell whose header contains the VPI/VCI afforded by the routing-information generating portion 221, and whose payload contains the data delivered from the interface unit 21. Further, the assembler 222 generates the internal cell by affixing to the head of the assembled ATM cell, a bus routing header which contains the address and channel line afforded by the routing-information generating portion 221. Besides, the assembler 222 transmits the generated internal cell to the transmission buffer unit 27.

The transmission buffer unit 27 once stores therein such internal cells received from the ATM cell processing units 22, and occasionally selects one internal cell to-be-transmitted from among the stored internal cells. Besides, the unit 27 notifies a request for transmitting the selected internal cell, to the controller 310 of the bus control unit 30, and it notifies to the priority class generator 301, the channel number of the non-ATM line 6 or 7 accommodated by the interface unit 21 which mates with the ATM cell processing unit 22 having transmitted the selected internal cell.

When the transmission request for the internal cell has occurred, the following operations are performed for the transmission request in a frame cycle immediately after the occurrence of the transmission request, by controls based on the frame cycle and data cycles which are expressed by timing signals outputted from the timing generation unit 29:

(1) First Data Cycle (Transmission/Reception of Priority Class Signal 1001)

The priority class generator 301 outputs a priority level corresponding to a channel number notified by the transmission buffer unit 27, in accordance with the correspondence between the channel number and the priority level set beforehand. The priority level expresses priority degrees by 32 stages of "0" to "31" equal to the bit width of the bus 1. Here, as the number of the stage is larger, the priority degree is higher.

The priority class decoder 302 decodes the priority level outputted from the priority class generator 301, into the priority class signal 1001 of 32 bits. In a case where the priority level expresses the priority degree of nth stage, only the nth bit is set at a signal of low level, and all the other bits are set at signals of high level, thereby to decode the priority level.

The controller 310 causes the selector 307 to select the output of the priority class decoder 302, and brings the transmission unit 32 into its transmission status. Thus, the priority class signal 1001 decoded by the priority class decoder 302 is outputted to the bus 1.

On the other hand, the priority class coincidence detector 303 decides if the priority degree expressed by the priority class signal 1001 decoded by the priority class decoder 302 coincides with the highest one of priority degrees expressed by priority class signals on the data bus 1, and it notifies the result of the decision to the controller 310.

Here, each bit of the data bus 1 expresses the logical sum of all outputs at the bit with the low level being significant. Accordingly, the bit at which any non-ATM line interface 2 or ATM line interface 3 has outputted the signal of the low level is received by the non-ATM line interfaces 2 and the ATM line interface 3 as the bit of the low level without fail.

(2) Second Data Cycle (Transmission of Bus Mastership Request Signal 1002)

In the bus control unit 30, in a case where the controller 310 has been notified of noncoincidence by the priority class coincidence detector 303, the acquisition of a bus mastership for the transmission request is regarded as having failed, and the operation in the first data cycle as indicated in the above item (1) is redone from the next frame cycle as processing for the transmission request.

In contrast, in a case where coincidence has been notified by the priority class coincidence detector 303, the controller 310 causes the selector 307 to select the bus mastership request signal 1002 obtained in such a way that the address decoder 305 decodes the address of the pertinent interface 2 itself stored in the address register 304, into 32 bits, and it brings the transmission unit 32 into the transmission status. Thus, the bus mastership request signal 1002 is outputted to the bus 1. Here, any of the numerical values of "0" to "31" equal to the bit width of the bus 1 is assigned as the address. The address decoder 305 decodes the address n by setting only the nth bit at a signal of low level and setting all the other bits at signals of high level.

(3) 18th Data Cycle (Reception of Bus Mastership Grant Signal 1004)

In the bus control unit 30, the address coincidence detector 306 accepts the bus mastership grant signal 1004 from the bus 1 through the reception unit 31, and it detects the coincidence/noncoincidence between an address indicated by the signal 1004 and the address of the pertinent interface 2 itself stored in the address register 303. Besides, it notifies the result of the detection to the controller 310. In a case where the result notified by the address coincidence detector 306 is the noncoincidence, the controller 310 regards the acquisition of the bus mastership for the transmission request as having failed and redoes the operation from the first data cycle as indicated in the above item (1), in the next frame cycle as processing for the transmission request.

In contrast, in case of the coincidence, the controller 310 regards the bus mastership as having been acquired and causes the transmission buffer unit 27 to transmit the internal cell selected by this transmission buffer unit 27, in the third to 17th data cycles of the next frame cycle. Besides, it causes the selector 307 to select the output of the transmission buffer unit 27 and brings the transmission unit 32 into the transmission status. Thus, the internal cell is outputted to the bus 1.

In this way, the transmission of the internal cell from the non-ATM line interface 2 to the bus 1 is completed.

By the way, in the third to 17th data cycles preceding the 18th data cycle stated above, the internal cell is transmitted to the bus 1 by the non-ATM line interface 2 or ATM line interface 3 which acquired the bus mastership in the last frame cycle.

Incidentally, after the transmission of the internal cell, the transmission buffer unit 27 verifies the normal reception of the transmitted internal cell by receiving the ACK/NACK signal of the ACK/NACK bus 14. In a case where the internal cell was not normally received, appropriate abnormality processing such as retransmission is executed.

Meanwhile, the bus mastership grant signal 1004 which the non-ATM line interface 2 receives in the 18th data cycle is outputted to the bus 1 by the bus control module 4 as explained before.

More specifically, in the bus control module 4, the bus arbitration control unit 42 accepts the bus mastership request signal 1002 from the bus 1 in the second data cycle of each frame cycle on the basis of the data clock and frame clock generated by the timing generation unit 41. Here, among the 32 bits of the bus mastership request signal, the positions of bits whose signals are at the low level express the addresses of the non-ATM line interfaces 2 or ATM line interface 3 which are requesting the bus mastership in the highest priority class at this point of time. By way of example, if the nth bit and mth bit have the signals of the low level, the non-ATM line interfaces 2 or ATM line interface 3 of the addresses n and m are requesting the bus mastership.

In this regard, in a case where only one of the non-ATM line interfaces 2 and ATM line interface 3 is requesting the bus mastership, the bus arbitration control unit 42 sets the address of one interface as an address to which the bus mastership is granted, and in a case where at least two of the interfaces 2 and 3 are requesting the bus mastership, the unit 42 selects one of them and sets the address thereof as an address to which the bus mastership is granted. Here, the selection is made so that the bus mastership may not be successively granted to the same address only, in other words, that the bus mastership may be afforded to the respective addresses in equal opportunities.

Besides, in the 18th data cycle, the bus arbitration control unit 42 controls into a transmission status the transmission unit 44 which is in a high impedance status in the other data cycles, and it transmits the bus mastership grant signal 1004 containing the selected address, to the bus 11 through the transmission unit 44.

The internal cell transmitted from the non-ATM line interface 2 to the bus 1 in the above way is received by the ATM line interface 3, and is processed as explained below.

In the ATM line interface 3, the address coincidence detector 306 accepts the bus routing header 1005 from the bus 1 through the reception unit 31 in the third data cycle, and it detects the coincidence/noncoincidence between an address indicated by the header 1005 and the address of the pertinent interface 3 itself stored in the address register 303. Besides, it notifies the result of the detection to the controller 310. In a case where the result notified by the address coincidence detector 306 is the coincidence, the controller 310 commands the reception buffer 28 to process data accepted from the bus 1 through the reception unit 31, namely, the internal cell 1003, as an effective internal cell in the third to 17th data cycles.

Subsequent to the reception of the command, the reception data buffer unit 28 checks the internal cell 1003 which it is commanded to process as the effective internal cell. Besides, the unit 28 outputs to the ACK/NACK bus 14 the ACK/NACK signal which indicates whether or not the particular internal cell 1003 has been normally received. Besides, in case of the normal reception of the particular internal cell 1003, the unit 28 determines the ATM cell processing unit 22 accommodating the ATM line 5 to which the ATM cell 1006 included in this cell 1003 is to be transmitted, from a channel number contained in the bus routing header 1005 of this cell 1003. Subsequently, the unit 28 transmits the ATM cell 1006 extracted from the particular internal cell 1003, to the determined ATM cell processing unit 22. Then, the ATM cell processing unit 22 having received the ATM cell 1006 transmits this ATM cell 1006 to the ATM line 5 which is accommodated by the unit 22 itself.

Thus far, there have been elucidated the operations in the case of transmitting the internal cell from the non-ATM line interface 2 to the bus 1.

Next, there will be elucidated operations in the case of transmitting the internal cell from the ATM line interface 3 to the bus 1.

The operations in the ATM line interface 3 in this case are substantially similar to the foregoing operations in the non-ATM line interface 2 in the case of transmitting the internal cell from the non-ATM line interface 2 to the bus 1. However, processing in the ATM cell processing unit 22 and priority level generation processing in the priority class generator 301 are different.

First, the processing in the ATM cell processing unit 22 will be explained.

The interface unit 21 receives the ATM cell sent from the ATM line accommodated by this unit itself, and inputs the received ATM cell to the ATM cell processing unit 22. Then, the routing information generating portion 221 of the ATM cell processing unit 22 obtains an address and a channel number corresponding to the VPI/VCI of the header of the ATM cell received from the interface unit 21, on the basis of the correspondence among VPIs/VCIs, addresses and channel numbers as is set in the routing information table 23 beforehand, and it affixes a bus routing header containing the address and channel number, to the particular ATM cell, thereby to generate the internal cell. Besides, the portion 221 transmits the generated internal cell to the transmission buffer 27. Here, the address is that of the non-ATM line interface 2 accommodating the non-ATM line 6 or 7 which is the destination of data stored in the particular ATM cell, and the channel number is that of the non-ATM line 6 or 7 which is the destination of the data stored in the particular ATM cell.

Next, the priority level generation processing in the priority class generator 301 will be explained.

The transmission buffer 27 once stores therein such internal cells received from the respective ATM cell processing units 22, and occasionally selects one internal cell to-be-transmitted from among the stored internal cells. Besides, the unit 27 notifies a request for transmitting the selected internal cell, to the controller 310 of the bus control unit 30, and it notifies to the priority class generator 301, the set consisting of the address and the channel number which are contained in the bus routing header of the selected internal cell.

The priority class generator 301 outputs the priority level which corresponds to the set consisting of the address and the channel number as notified by the controller 310, in accordance with the preset correspondence between priority levels and sets respectively consisting of addresses and channel numbers.

The remaining operation of transmitting the internal cell in the ATM line interface 3 is similar to the foregoing operation of transmitting the internal cell in the non-ATM line interface 2.

The internal cell transmitted from the ATM line interface 3 to the bus 1 in the above way is received and processed by any of the non-ATM line interfaces 2. The operation of receiving the internal cell in the non-ATM line interface 2 is substantially similar to the foregoing internal cell reception operation in the ATM line interface 3 in the case of transmitting the internal cell from the non-ATM line interface 2 to the bus 1. However, the former differs from the latter in the point that, in the ATM cell processing unit 22 having received the ATM cell, the ATM cell is disassembled to restore data, which is transmitted to the non-ATM line 6 or 7 through the interface unit 21.

The embodiment of the present invention has been described above.

As described above, according to this embodiment, the transfers of ATM cells on the bus 1 can be subjected to the priority control for the respective non-ATM lines 6, 7 to and from which data stored in the ATM cells are transmitted and received. Here, in general, the priority degree of the ATM cell is roughly determined by the type of the non-ATM line 6 or 7 to and from which data stored in the ATM cell is transmitted and received. Thus, according to this embodiment, it is possible to arbitrate for a bus mastership in accordance with the priority degree of the data to be transferred on the bus 1. Moreover, according to this embodiment, such arbitration for the bus mastership can be implemented without laying any signal bus for the bus mastership control, in addition to the bus 1 for transferring the ATM cells, accordingly, by a comparatively simple construction.

The present invention is not restricted to the foregoing embodiment, but it is capable of numerous modifications and alterations within the scope of the purport thereof.

By way of example, the embodiment has been described concerning the case where the transfers of the ATM cells on the bus 1 are subjected to the priority control for the respective non-ATM lines 6, 7 to and from which the data stored in the ATM cells are transmitted and received. The priority control, however, need not always be performed in units of the non-ATM lines 6, 7. This priority control may well be performed in any desired units expressive of the priority degrees of the ATM cells. By way of example, the arbitration for the bus mastership may well be performed for the individual ATM cells by generating priority classes in accordance with the quality classes and VPIs/VCIs of the individual ATM cells.

Besides, although the embodiment has been described by exemplifying the application of the bus system according to the present invention to the ATM multiplexer, the bus system according to the present invention is also applicable to an ATM exchange and any other apparatus wherein data are transferred among a plurality of modules by the use of a bus. By way of example, the ATM exchange to which the bus system according to the present invention is applied can be constructed by replacing the non-ATM line interfaces 2 with ATM line interfaces 3 in the construction shown in FIG. 1.

Besides, the bus routing header explained in the embodiment may well contain in addition to the address and channel number of the destination of the internal cell, priority degree information for performing the priority control of the included ATM cell of the particular internal cell for the transmission to the line, on the reception side of the particular internal cell, or information for designating such a mode as the loop-back transfer of the ATM cell.

Further, a bus system according to the present invention is also applicable to an IP multiplexer. There will now be described a case where the bus system according to the present invention is applied to the IP multiplexer.

Figure 7:
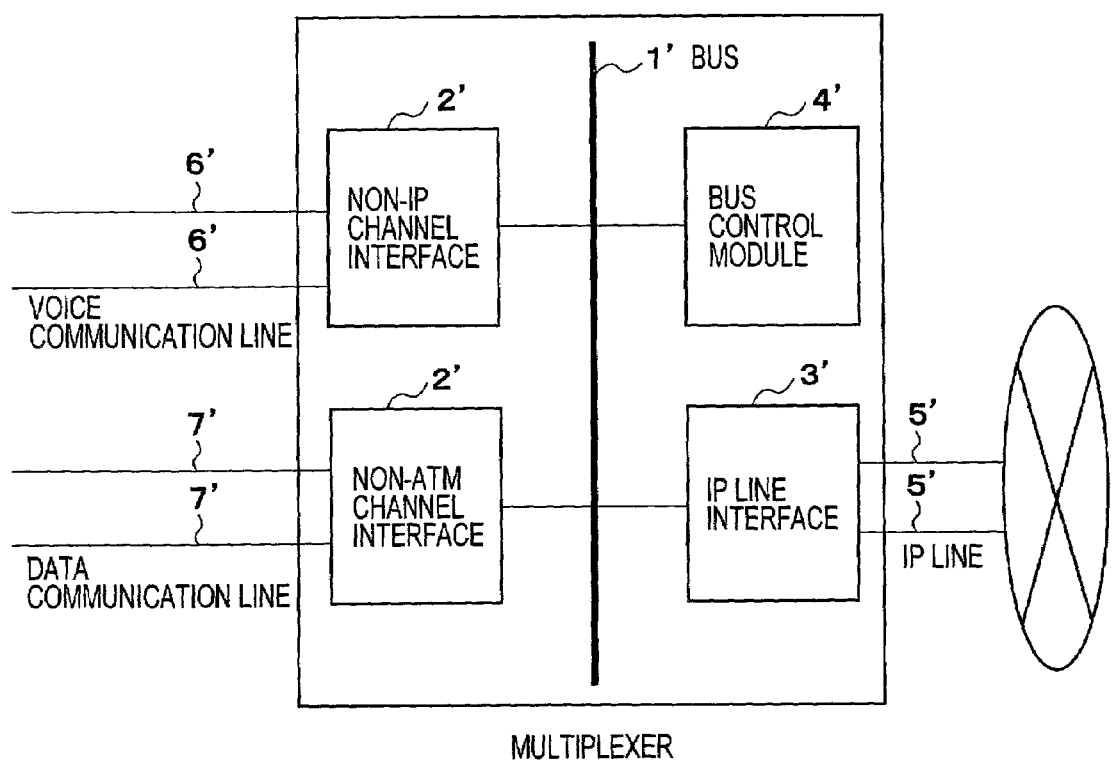
FIG. 7 is a block diagram of an IP multiplexer to which a bus system according to the present invention is applied.

FIG. 7 is a block diagram of the IP multiplexer to which the bus system of the present invention is applied.

The difference of the IP multiplexer in FIG. 7 from the ATM multiplexer in FIG. 1 is that a non-IP line interface 2', an IP line interface 3' and an IP line 5' are respectively disposed instead of the non-ATM line interface 2, the ATM line interface 3 and the ATM line 5.

In the above construction, the non-IP line interface 2' generates an internal packet by turning into an IP packet, data which have been sent from the voice communication line 6' or data communication line 7' accommodated by this interface 2' itself, and by affixing to the IP packet, a bus routing header which indicates the IP line interface 3' being the destination of this IP packet. Besides, the non-IP line interface 2' transmits the internal packet to the bus 1. The IP line interface 3' checks the bus routing header of the internal packet transmitted by the non-IP line interface 2', and it receives the particular internal packet when the bus routing header indicates the address of a module accommodated by this interface 3' itself. Further, the IP line interface 3' derives the IP packet stored in the internal packet and transmits the derived IP packet to the destination IP line 5'.

On the other hand, the IP line interface 3' generates an internal packet by affixing a bus routing header to an IP packet sent from the IP line 5' accommodated by this interface 3' itself. Here, the bus routing header indicates the non-IP line interface 2' to which the voice communication line 6' or data communication line 7' being the destination of the particular IP packet is connected, on the basis of a corresponding IP address. Besides, the IP line interface 3' transmits the generated internal packet to the bus 1. The non-IP line interface 2' checks the bus routing header of the internal packet transmitted by the IP line interface 3', it receives the particular internal packet when the bus routing header indicates the address of a module accommodated by this interface 2' itself, and it derives data from the IP packet stored in the internal packet and transmits the derived data to the destination non-IP line.

The bus control module 4 arbitrates for the mastership of the bus 1 for the IP packet transmissions by the non-IP line interfaces 2' and the IP line interface 3' as explained above.

Figure 8:
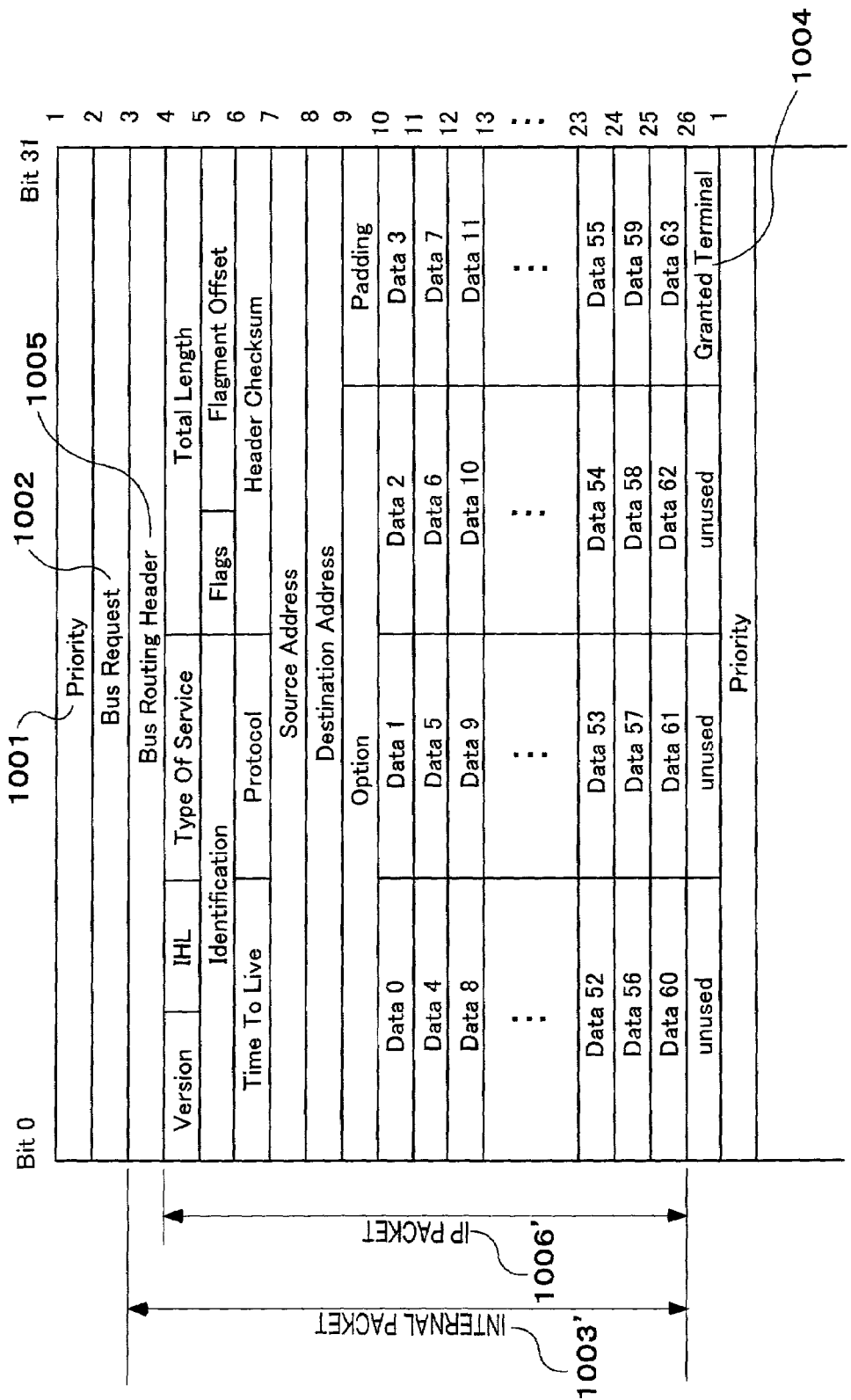
FIG. 8 is a diagram showing the transmission format of data which are transmitted on a bus 1 shown in FIG. 7.

Next, a transmission format on the data bus 11 is shown in FIG. 8.

As shown in the figure, the transmission format on the data bus 11 is such that a priority class signal (Priority) 1001 is transferred in the first data cycle of each frame cycle being, for example, 26 data cycles, that a bus mastership request signal (Bus Request) 1002 is transferred in the second data cycle, that the internal packet 1003' explained before is transferred in the third to 25th data cycles, and that a bus mastership grant signal (Granted Terminal) 1004 is transferred in the 26th data cycle. Here, the bus routing header (Bus Routing Header) 1005 explained before is transmitted in the third one of the third to 25th data cycles being the transmission data cycles of the internal packet, and the IP packet 1006' is transmitted in the remaining fourth to 25th cycles.

By the way, in the case of the transmission format shown in FIG. 8, the frame clock bus 13 shown in FIG. 2 shall transmit a frame clock of 26 data cycles.

Figure 9:
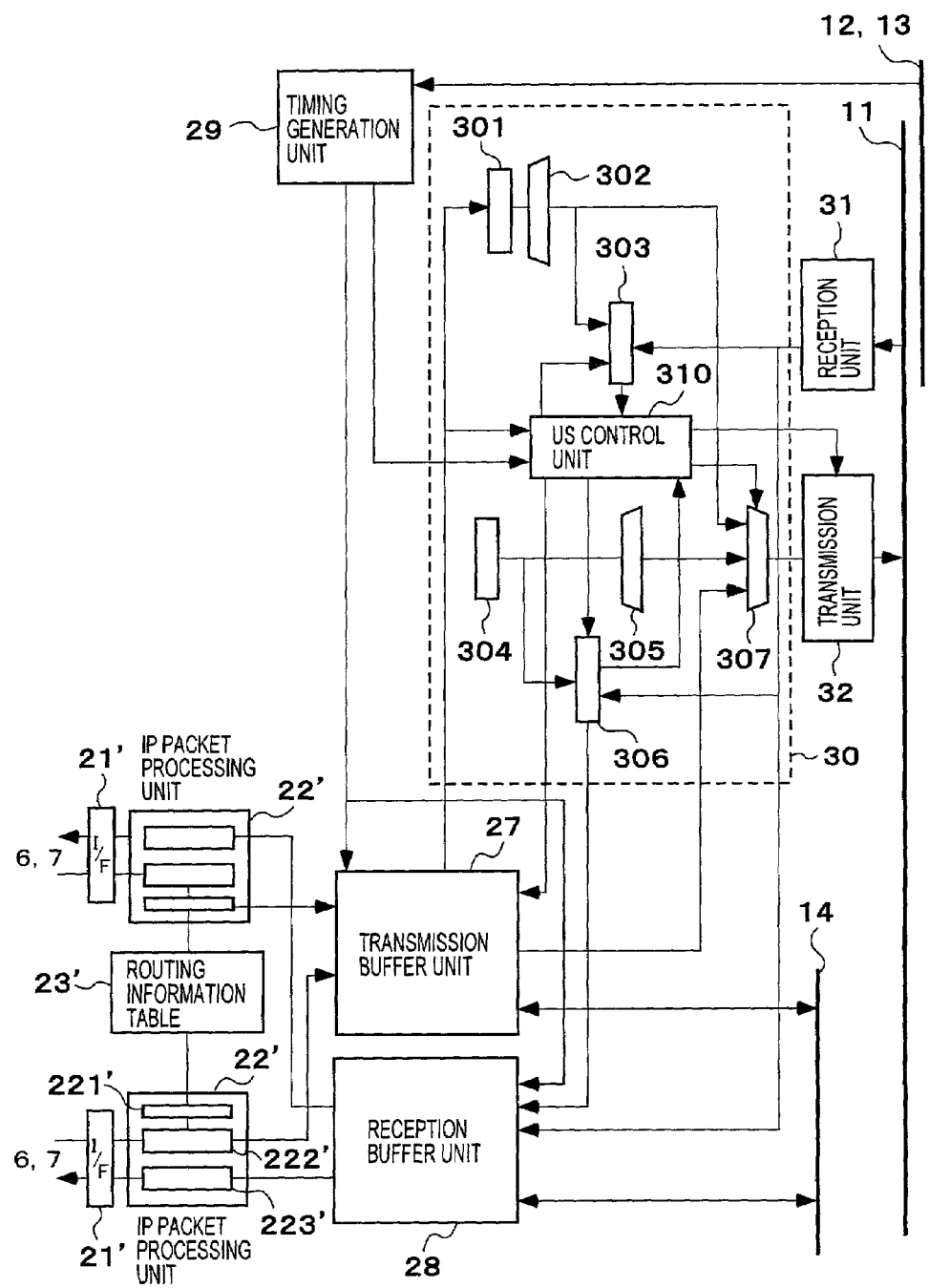
FIG. 9 is a block diagram of a non-IP line interface shown in FIG. 7.

Next, the construction of the non-IP line interface 2' is shown in FIG. 9.

As shown in the figure, the non-IP line interface 2' includes a set consisting of an interface unit 21' and an IP packet processing unit 22', in correspondence with each of the non-IP lines 6', 7', such as voice communication lines and data communication lines, which are accommodated by this interface 2'. In addition to the above, the non-IP line interface 2' includes a routing information table 23', a transmission buffer unit 27, a reception buffer unit 28, a timing generation unit 29, a bus control unit 30, a reception unit 31 and a transmission unit 32.

Here, the timing generation unit 29 receives the data clock and frame clock from the data clock bus 12 and frame clock bus 13, respectively, and it generates timing signals expressive of the frame cycle and data cycles on the basis of the received clocks and feeds them to pertinent portions.

Further, the IP packet processing unit 22' includes a routing-information affording portion 221', an IP packet assembler 222' and an IP packet disassembler 223'.

Besides, the bus control unit 30 includes a priority class generator 301, a priority class decoder 302, a priority class coincidence detector 303, an address register 304, an address decoder 305, an address coincidence detector 306, a selector 307 and a controller 310.

Figure 10:
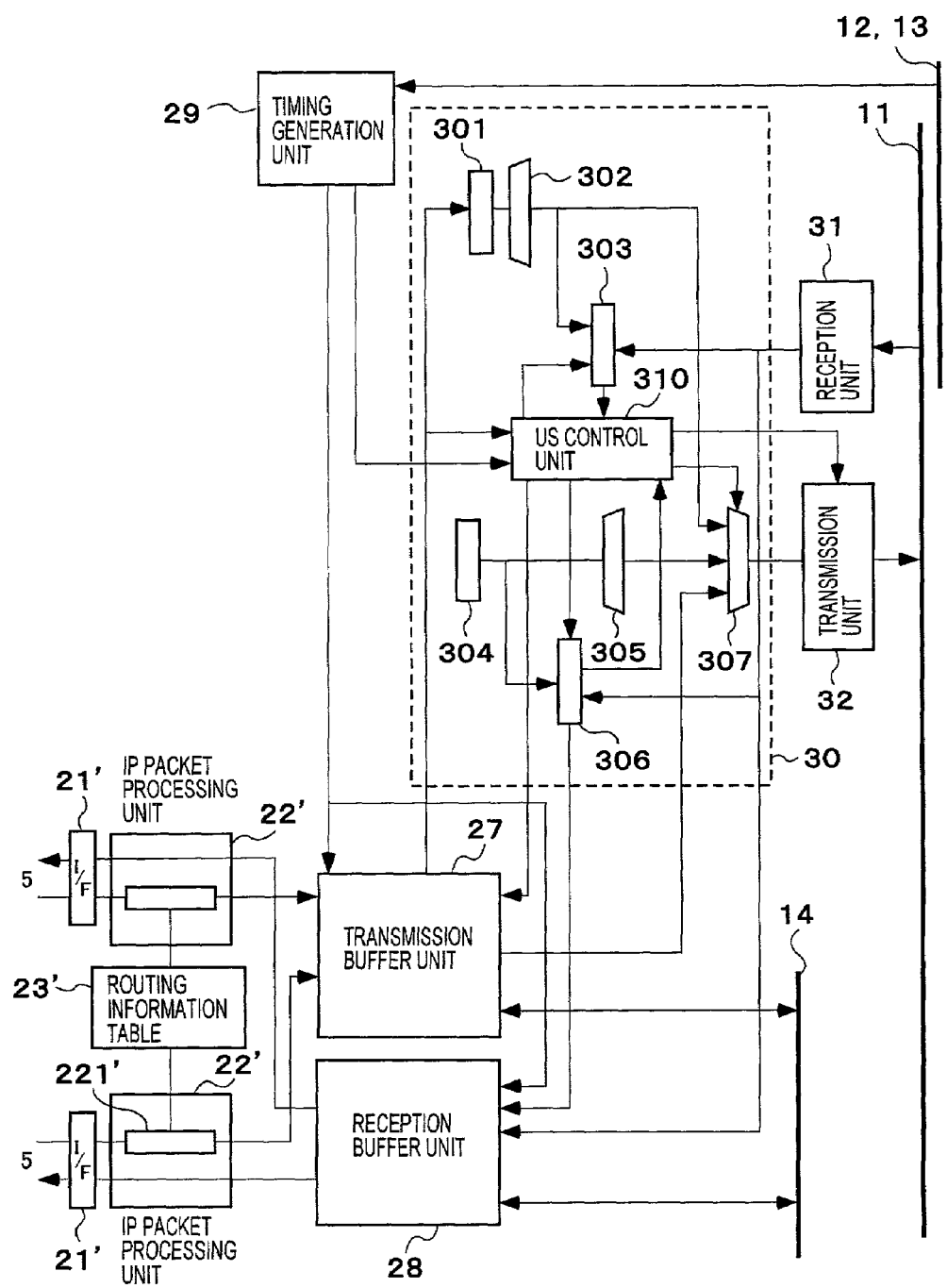
FIG. 10 is a block diagram of an IP line interface shown in FIG. 7.

Next, the construction of the IP line interface 3' is shown in FIG. 10.

As shown in the figure, the construction of the IP line interface 3' is substantially similar to that of the non-IP line interface 2'. However, the former differs from the latter in the point that neither the IP packet assembler 222' nor the IP packet disassembler 223' is disposed in the IP packet processing unit 22'.

Here, unique addresses are respectively assigned to the non-IP line interfaces 2' and the IP line interface 3' beforehand. Each of the non-IP line interfaces 2' and IP line interface 3' stores the address assigned thereto, in the address register 304 of the bus control unit 30. Besides, channel numbers being unique in the non-IP line interfaces 2' or the IP line interface 3' are respectively preassigned to the non-IP lines 6', 7' accommodated by the non-IP line interfaces 2' or to the IP lines 5' accommodated by the IP line interface 3'. Thus, the non-IP lines 6', 7' or the IP lines 5' are respectively specified uniquely by the combinations between the addresses and the channel numbers.

There will now be elucidated the details of the operation of transferring IP packets with the bus 1 in the IP multiplexer of the above construction.

First, an operation in the case of transmitting an internal packet from each non-IP line interface 2' to the bus 1 proceeds as explained below.

In the non-IP line interface 2', the interface unit 21' receives data sent from the non-IP line 6' or 7' accommodated by itself and inputs the data to the IP packet processing unit 22'.

Subsequent to the data input, the routing-information generating portion 221' of the IP packet processing unit 22' reads out an IP address which corresponds to the non-IP line 6' or 7' having sent the data and which is previously set in the routing information table 23', and it affords it to the IP packet assembler 222'.

Subsequently, the IP packet assembler 222' assembles the IP packet whose header contains the IP address afforded by the routing-information generating portion 221', and whose data area contains the data delivered from the interface unit 21'. Further, the assembler 222' generates the internal packet by affixing to the head of the assembled IP packet, a bus routing header which contains the address afforded by the routing-information generating portion 221'. Besides, the assembler 222' transmits the generated internal packet to the transmission buffer unit 27.

The transmission buffer unit 27 once stores therein such internal packets received from the respective IP packet processing units 22', and occasionally selects one internal packet to-be-transmitted from among the stored internal packets. Besides, the unit 27 notifies a request for transmitting the selected internal packet, to the controller 310 of the bus control unit 30, and it notifies to the priority class generator 301, the channel number of the non-IP line 6' or 7' accommodated by the interface unit 21' which mates with the IP packet processing unit 22' having transmitted the selected internal packet.

Thenceforth, when the transmission request for the internal packet has occurred, controls based on a frame cycle and data cycles which are expressed by timing signals outputted from the timing generation unit 29 are performed for the transmission request in the frame cycle immediately after the occurrence of the transmission request. In this manner, operations similar to those of the non-ATM line interface 2 in the ATM multiplexer as described with reference to FIGS. 1 to 6 proceed in the non-IP line interface 2'.

Besides, operations in the case of transmitting internal packets from the IP line interface 3' to the bus 1 are substantially similar to the foregoing operations in the non-IP line interface 2' in the case of transmitting the internal packet from the non-IP line interface 2' to the bus 1. That is, operations similar to those of the ATM line interface 3 in the ATM multiplexer as described with reference to FIGS. 1 to 6 proceed in the IP line interface 3'.

As set forth above, according to the present invention, arbitration can be performed for a bus mastership in accordance with the priority degrees of data which are to be transferred on a bus, by a comparatively simple construction.

What is claimed is:

1. An Asynchronous Transfer Mode (ATM) apparatus for transmitting and receiving ATM cells among a plurality of line interfaces which accommodate ATM lines or non-ATM lines, comprising:
   a data bus connected to the plurality of line interfaces; and
   bus control means connected to said data bus,
   wherein each of said plurality of line interfaces includes:
   first transmission means for transmitting to said data bus a transmission request containing an indication of a degree of priority of an ATM cell and an address of a channel interface, when transmitting said ATM cell to said data bus, and
   second transmission means for transmitting said ATM cell to said data bus when a transmission grant signal containing the address of said line interface has been received from said data bus, and
   wherein said bus control means, upon receiving said transmission request, selects the channel interface which transmitted said transmission request containing the highest degree of priority ATM cell, and transmits a transmission grant signal containing the selected channel interface, to said data bus.

2. An ATM apparatus as defined in claim 1, wherein:
   said second transmission means affixes an address of the line interface being a transmission destination of said ATM cell, to the particular ATM cell, and then transmits said ATM cell to said data bus; and
   each of said plurality of line interfaces further includes reception means for receiving said ATM cell to which the address of the pertinent line interface itself is affixed.

3. An Asynchronous Transfer Mode (ATM) apparatus for transmitting and receiving ATM cells between at least one non-ATM line interface accommodating a plurality of non-ATM lines and an ATM line interface accommodating at least one ATM line, comprising:
   a data bus connected to at least one non-ATM line interface and the ATM line interface; and
   bus control means connected to said data bus;
   wherein said non-ATM line interface includes:
   first transmission means for storing data sent from the non-ATM line accommodated by the non-ATM line interface in the ATM cell, and for transmitting said ATM cell to said ATM line interface through said data bus, first reception means for transmitting data stored in the ATM cell sent from said ATM line interface through said data bus to the non-ATM line accommodated by the non-ATM interface, and first control means for transmitting to said data bus an indication of a degree of priority degree which is determined in accordance with said non-ATM line being a source of the data stored in said ATM cell intended to be transmitted by said first transmission means, when transmitting said ATM cell to said data bus, and a transmission request which contains an address of said non-ATM interface, and for causing said first transmission means to transmit said ATM cell intended to be transmitted, when a transmission grant signal containing the address of said pertinent interface itself has been received from said data bus;

wherein said ATM channel interface includes:

second reception means for transmitting the ATM cell sent from said non-ATM line interface through said data bus, to the ATM line accommodated by the non-ATM channel interface, second transmission means for transmitting said ATM cell sent from said ATM line accommodated by the ATM channel interface, to said non-ATM line interface through said data bus, and second control means for transmitting to said data bus a priority degree which is determined in accordance with said non-ATM line being a destination of the data stored in said ATM cell intended to be transmitted by said second transmission means, when transmitting said ATM cell to said data bus, and a transmission request which contains an address of said ATM channel interface, and for causing said second transmission means to transmit said ATM cell intended to be transmitted, in a case where a transmission grant signal containing the address of said pertinent interface itself has been received from said data bus; and wherein said bus control means, in receiving said transmission request, selects the non-ATM channel interface or the ATM channel interface which transmitted the transmission request containing the highest degree of priority ATM cells, and transmits a transmission grant signal containing an address of the selected non-ATM channel interface or the ATM channel interface, to said data bus.

4. An Internet Protocol (IP) apparatus for transmitting and receiving IP packets among a plurality of line interfaces which accommodate IP lines or non-IP lines, comprising:

a data bus connected to the plurality of line interfaces, and bus control means connected to said data bus;

wherein each of said plurality of line interfaces includes:

first transmission means for transmitting to said data bus a transmission request containing an indication of a degree of priority of said IP packet and an address of said channel interface, when transmitting said IP packet to said data bus;

second transmission means for transmitting said IP packet to said data bus when a transmission grant signal containing the address of said line interface has been received from said data bus; and wherein said bus control means, upon receiving said transmission request, selects the channel interface which transmitted the transmission request containing the highest degree of IP packets, and transmits a transmission grant signal containing address of the selected channel interface to said data bus.

5. A bus system for transmitting and receiving data among a plurality of modules, comprising:

a data bus connected to the plurality of modules, and bus control means connected to said data bus; wherein each of said plurality of modules includes:

decision means operating in the presence of the data intended to be transmitted to said data bus, to transmit a priority degree of said data intended to be transmitted, to said data bus in a first cycle which is a periodical timing stipulated in common for all the modules beforehand, and to decide whether or not the highest one of the priority degrees transmitted to said data bus coincides with said priority degree transmitted by the pertinent module itself, first transmission means for transmitting an address of said pertinent module itself to said data bus in a second cycle which is a periodical timing stipulated in common for all said modules beforehand, in a case where said decision means has decided that said highest one of said priority degrees transmitted onto said data bus coincides with said priority degree transmitted by said pertinent module itself, and second transmission means for transmitting said data intended to be transmitted, to said data bus in a fourth cycle which is a periodical timing stipulated in common for all said modules beforehand, in a case where a transmission grant signal containing the address of said pertinent module itself has been received from said data bus in a third cycle which is a periodical timing stipulated in common for all said modules beforehand; and said bus control means includes third transmission means for selecting one of the addresses received from said data bus in the second cycle, and for transmitting the transmission grant signal containing the selected address, to said data bus in the third cycle.

* * * * *